United States Patent
Ebner

(10) Patent No.: US 12,433,210 B1
(45) Date of Patent: Oct. 7, 2025

(54) SELF-WATERING SYSTEM

(71) Applicant: Suhail Ebner, London (GB)

(72) Inventor: Suhail Ebner, London (GB)

(*) Notice: Subject to any disclaimer, the term of this patent is extended or adjusted under 35 U.S.C. 154(b) by 0 days.

(21) Appl. No.: 18/831,160

(22) Filed: Aug. 23, 2024

(51) Int. Cl.
*A01G 27/04* (2006.01)

(52) U.S. Cl.
CPC .................................. *A01G 27/04* (2013.01)

(58) Field of Classification Search
CPC ... A01G 27/04; A01G 27/0006; A01G 37/005
See application file for complete search history.

(56) References Cited

U.S. PATENT DOCUMENTS 5,379,547 A * 1/1995 Whisenant ............... A01G 9/12
47/79

2001/0029699 A1 * 10/2001 Fidotti ................. A01G 27/006
47/79
2004/0200142 A1 * 10/2004 Ito ............................ A01G 9/02
47/41.14

* cited by examiner

*Primary Examiner* — Kristen C Hayes

(57) ABSTRACT

A self-watering system for irrigating plants comprising a planter divided by a partition wall separating the planter into two parts a growing medium container and lower part a liquid reservoir, the partition wall having an aperture for a liquid movement device and plurality of aeration apertures, the growing medium container having plurality of air inlets at the base. The system comprising a liquid movement device for moving liquid via hydrostatic pressure and capillary action. The liquid movement device comprises a hollow body, rock wool or bryophyte inside the hollow body, and a liquid permeable material inside a bag of interwoven materials. The liquid permeable materials cover an opening of the hollow body. A layer of rock wool or dry compressed bryophyte covers the bag.

18 Claims, 4 Drawing Sheets

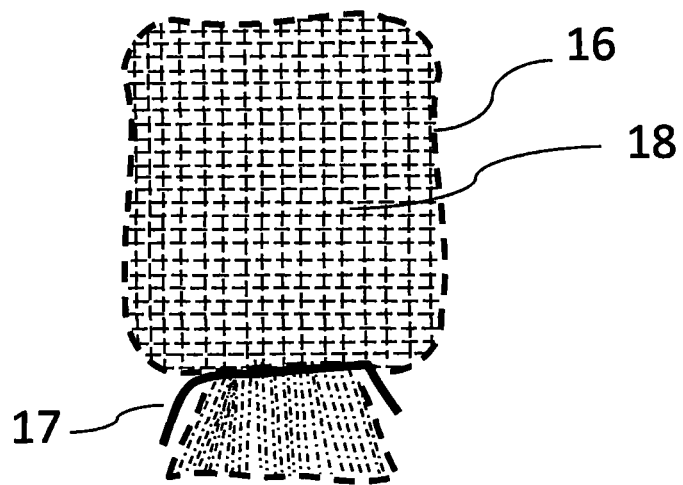
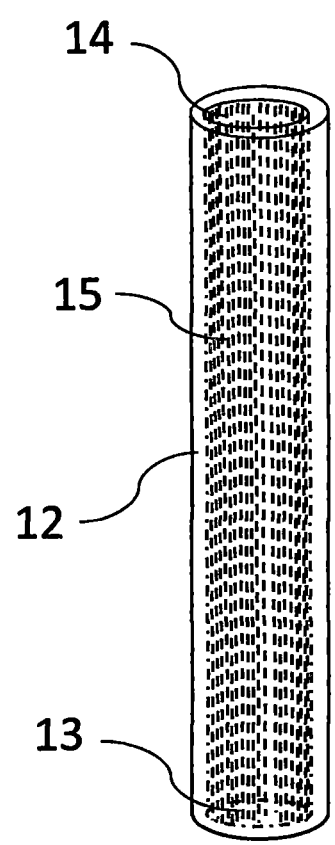
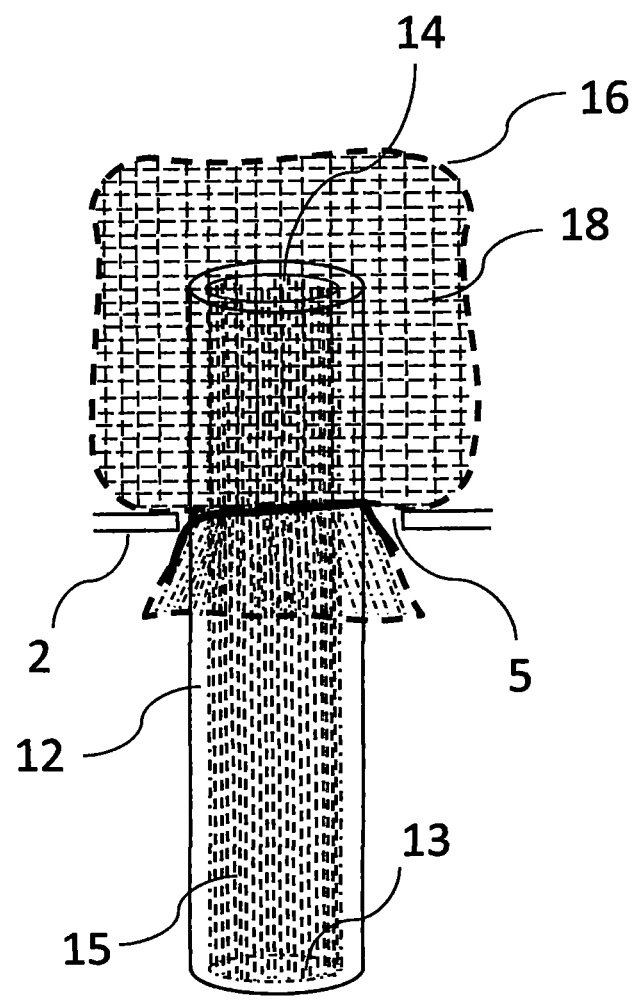
Figure 1         Figure 2

SELF-WATERING SYSTEM

TECHNICAL FIELD

The present application can be used for many fields, in this first part of the application, it is used as self-watering system for irrigating plants. The aim of the application in the context of horticultural and agricultural use is to save water by eliminating drainage and by controlling evaporation.

BACKGROUND

Self-watering systems have a long history of inventions which have originated from commercial agriculture companies, universities, and academic research, there are many granted patents. However, having visited stores which specialize in plants, garden centers, nurseries and supermarkets, there is not a reliable system which suitable for a variety of plants which can be used by all, this is because the systems available all have their flaws.

In prior art many applications divide the pot into two compartments, the upper compartment containing soil with the plant and the lower compartment as water reservoir, a capillary apparatus in between the two compartments sending water upwards by capillary action.

The wick system is by far the best available as it is passive and simple. The downside to the wick system is that it works better with plants which need less water. Plants like tomatoes which need large amounts of water are not suitable for wick systems, although herbs which need much less water work well.

Main Problems with Prior Art

Low Quality Capillary Materials

Many applications used fine sand, large particle sand, soil and granulated soil, these materials have low quality capillary action, slowing the process and reducing the amount of water transported vertically.

Using Wick Materials as a Capillary Material

Many applications used wicking material, for example wool, cotton, manila hemp, silk, jute cloth, charcoal cloth, wood pulp paper, nylon, polyester, and polypropylene.

Wicking capillary materials natural or synthetic have poor capillary action to transport water and should not be used in self-watering system.

Disadvantages of Wicking Self-Watering Pot
  Not all plants thrive with a wicking system, the method is not particularly suitable for thirsty plants.
  The system is unable to sustain a tree or good number of plants in single pot, and it can only be used for house plants and domestic outdoor growing.
  There is not a developed, effective system for commercial crops.

Using Rock Wool as a Wick

Rock wool was used in the 1930s to grow vegetables for the Pan American Airlines passengers. Since then, rock wool has evolved and improved and has been used all over the world as a soilless growing medium.

Rock wool combines high water-holding capacity with good aeration, which means it provides an almost perfect soilless growing medium. It also has a good capillary action, unfortunately, using rock wool alone as wick is not fully effective.

Rock wool is very delicate, and is easily damaged under slight pressure, with the weight of a growing medium and the plant together for long time—a whole season or perhaps years for indoor plants—the fragile microstructure of rock wool can easily be destroyed, and the capillary action is compromised.

Capillary Apparatus Made from Porous Material

The foundation of the prior art is a capillary apparatus made from porous material, with water transported through the pores, almost all prior art recommended using wide pores stating the wider the diameter of the pores the faster the amount of water transported.

The most significant disadvantage of porous material is the gradual seepage of soil from the growing medium through the pores which leads to a blockage of the capillary apparatus-stopping it from working completely.

Contact Surface Area Size

A small contact surface area between capillary materials and the growing medium leads to patchy water distribution area in growing medium.

Intermediary Materials

No specific intermediary material used as a recipient of water after sending the water vertically to the growing medium, most prior art send water to soil growing medium lead to seepage of soil into the capillary materials and clog the system.

Saturated Base

Some prior art was successful in sending water vertically, however, the water lays stagnant and saturates the base of the growing medium. Self-watering systems supply water constantly by default, this is unnatural to the plant (except swamp and aquatic plants). In natural habitats, the growing medium and the roots will be saturated for days at maximum rate then the water is absorbed by the plant and the remaining excess will either evaporate or drain away, allowing the roots and the growing medium to dry. At this stage the roots start absorbing oxygen which is vital for the plant's growth and wellbeing. Stagnant water and high moisture will suffocate the plant and start roots decay.

Barrier

No barrier between growing medium and the capillary material or between growing medium and the porous material of capillary apparatus, lead to seepage of soil into the capillary materials and into porous materials and clog the system.

Root Aeration

In most prior art, the amount of water delivered vertically to the plant is small and barely enough to support the plant, this is especially true when using wicking material. So, any attempt to aerate the growing medium will increase the likelihood of dehydration and death of the plant. Some prior art created small holes between the two compartments allowing moist air to penetrate the base of growing medium, this will not solve the problem as moist air still trapped in the base of growing medium container and has nowhere to go, again high moisture will suffocate the plant.

These main problems need to be addressed properly and solved.

Other Minor Problems with Prior Art

Most applications using the divided pot share similarities:
  limited to horticulture use—not suitable for commercial crops production or planting trees.
  limited to a single growing medium, most commonly soil.
  reliant solely on capillary action.
  many applications perforate the capillary apparatus, believing this will increase the water supply in the growing medium-perforating the apparatus will stop the capillary rise, so this is an error.

reliant on feeling whether the growing medium is dry or moist, no mention of practical ways to establish when to fill the water reservoir as most applications:
did not recommend using transparent or clear materials for water reservoirs.
did not install water level indictor window.
did not install or mention dipstick measurement.
did not mention technology such as water or humidity sensors linked to the device by WI-FI or Bluetooth.

If filling the reservoir is based on guess work and instinct, the plant is at risk from overwatering and death.

While previous inventions operate inadequately, there remains a need for a more effective delivery system of water to the growing media of a plant which will not result in the over-watering or under-watering-conditions which are common in the existing state of the art.

BRIEF DESCRIPTION OF THE DRAWINGS

FIG. 1 illustrates vertical exploded view of the hollow body and the bag, two parts of the liquid movement device.

FIG. 2 illustrates a partial sectional view of the hollow body and the bag inside the first aperture of partition wall.

The present disclosure and its embodiments will be understood more fully from the detailed description given below and from accompanying drawings which, however, should not be taken to limit the present disclosure to the specific embodiment, but for explanation and understanding only.

Figure 3:
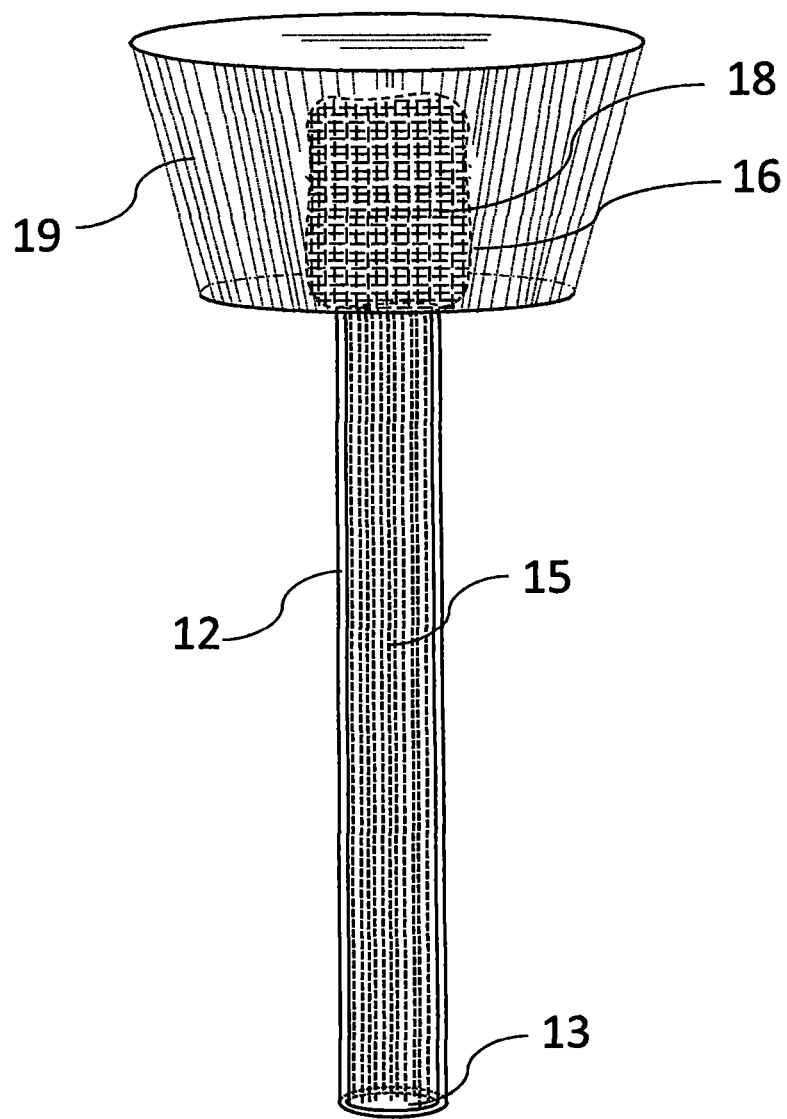
FIG. 3 illustrates front perspective view of all parts of the liquid movement device.
Figure 4:
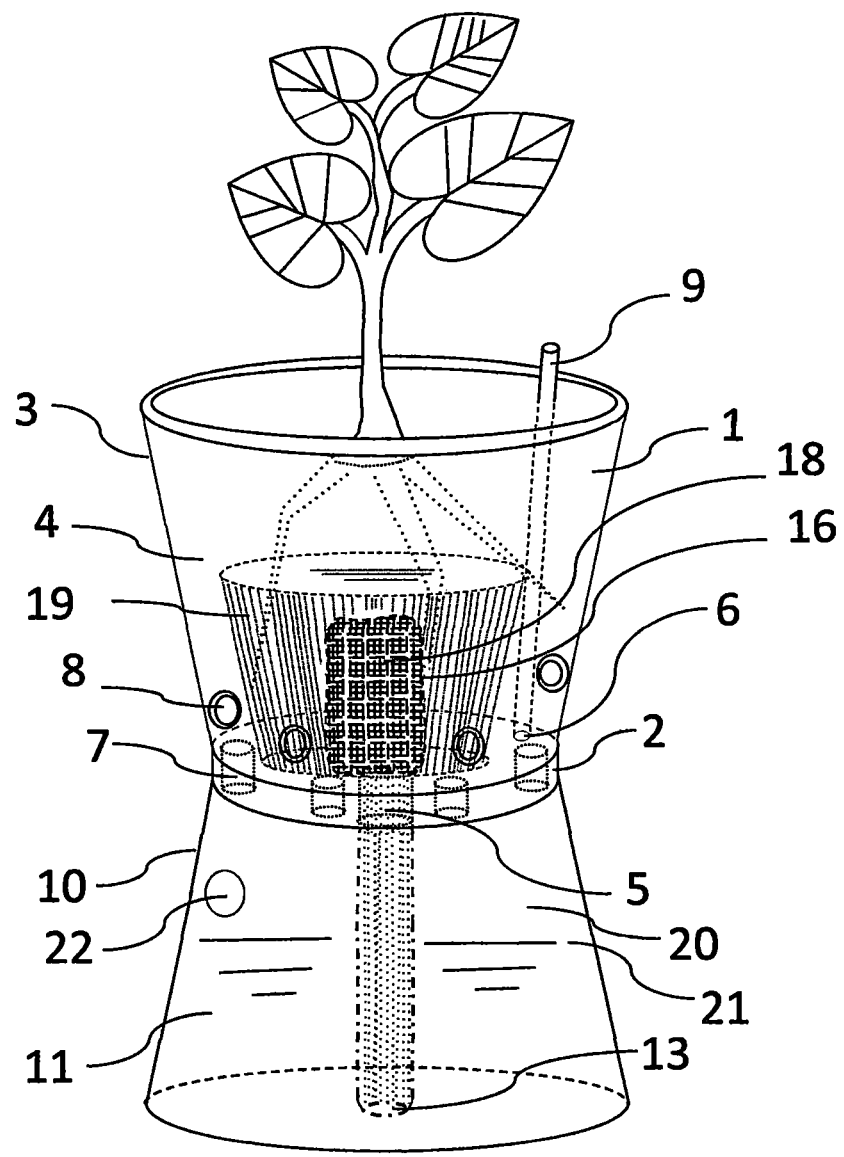
FIG. 4 illustrates front perspective view of self-watering planter showing partition wall and liquid movement device.

A Self-Watering System for Irrigating Plants Comprising:
a planter 1 which may also be termed plant pot FIG. 4 the planter divided by a partition wall 2 separating the planter into two parts upper part a growing medium container 3 which may also be termed second container filled with growing medium 4 and a plant, and lower part a liquid reservoir 10 which may also be termed first container, the partition wall having a first aperture 5 which may also be termed main aperture and a second aperture 6 which defines the liquid inlet for receiving a liquid tube.
aeration holes which may also be termed aeration apertures:
the partition wall 2 comprises of a plurality of aeration apertures 7 and there are plurality of air inlets 8 distributed around the base of growing medium container 3 the planter further comprise a liquid tube 9 having open ends and which extends from the second aperture 6 through a space defined by the medium container 3 a liquid movement device comprising: FIG. 1,2,3
a hollow body 12 having a first opening 13 for positioning at or in a source of liquid, a second opening 14 for position at or adjacent to a growing medium of a planter, the hollow body is a continuous wall extending from the first opening to the second opening, the hollow space may also be termed first volume
the body contains an elongated rock wool or bryophyte 15 filling the full length of the hollow body 12, a liquid permeable material 18 inside a bag 16 of interwoven, flexible and water permeable material, the space inside the bag may also be termed second volume, the liquid permeable material 18 covering the second opening 14 of the hollow body 12, the bag tied by ribbon 17 to the hollow body 12 to secure it in place, a layer of rock wool or dry compressed bryophyte 19 covering the bag the liquid movement device inserted inside the planter through the first aperture 5 and the first opening 13 of the hollow body touching the base of the liquid reservoir 10 aperture 22 in liquid reservoir as second option to fill the liquid reservoir with liquid, the aperture can be closed or left open.

Bryophyte is the informal group name for moss, liverworts, and hornworts.

Operation and Mechanism of Action

When liquid is added to the planter through liquid tube 9, an air gap 20 created between liquid level 21 and partition wall 2, the liquid rushes through the first opening 13 of the liquid movement device by hydrostatic pressure, this is more powerful than capillary rise alone pushing the liquid up, so the level of liquid inside the device reaches the same level 21 as is in the liquid reservoir in a short time.

The capillary action created inside the hollow body 12 moves the liquid from a level equal to the reservoir level 21 to the second opening 14 of the hollow body; this is a short distance.

When liquid leaves the rock wool or bryophyte 15, it is surrounded by liquid permeable material 18, liquid moves via infiltration from areas of higher potential to areas of low potential due to potential difference.

Outwards movement, lateral flow results due to force of attraction to solid particles in the growing medium (the matric potential) and water moves downwards (percolation) due to gravitational potential. Upward movement due to capillarity, a substantial amount of liquid is available ready to move to the layer of rock wool or dry compressed bryophyte 19 at this stage. The movement of liquid from liquid permeable material to the layer of rock wool or dry compressed bryophyte 19 and then to growing medium 4 by infiltration.

The current application does not rely entirely on capillary rise, the system considers hydrostatic pressure, capillary rise, and infiltration in a combination.

In the current application when liquid is absorbed by the plant, the liquid level 21 falls in the liquid reservoir 10 which in turn lowers hydrostatic pressure which reduces the amount of liquid sent upwards. The current application mimics nature, it supplies water at a decelerated rate, the decelerated rate of liquid supply is one of the factors making this application successful and outstanding from prior art.

The basic function of the liquid movement device is liquidly communicating the growing medium with the liquid reservoir.

It is the protection of the delicate microstructure of rock wool or bryophyte 15 by the hollow body 12, the excellent capillary action of rock wool or bryophyte, the high permeability rate of liquid permeable material 18 and the filtration and prevention of small particles of the layer of rock wool or dry compressed bryophyte 19 from blocking the system which makes the liquid movement device efficient and sufficiently robust, delivering a substantial quantity of water to the plant in the growing medium.

Moist air moves towards dry air due to the difference in vapor pressure, a process driven by the natural tendency of systems to move towards equilibrium. It is the general principle of diffusion, where substances move from areas of higher concentration to areas of lower concentration. This movement of air creates a micro current between the moist air at aeration apertures 7 and the dry air at air inlets 8. The air current or micro air current at the base of the growing medium container aerates the roots and reduce humidity as moist air has the chance to escape out the pot through air inlets.

The aeration of roots through aeration apertures 7 and air inlet 8 supplies air current to the plant, the whole system supplies the plant with air and water at the same time.

Slowly and constantly the liquid movement device absorbs liquid to the last drop of liquid in the reservoir leaving it dry and empty, drainage is completely abolished, and evaporation is reduced to minimum and only through the air inlets 8 distributed around the base of growing medium container 3.

The plant is irrigated from below and direct to the root zone. For the water to escape to the surface of the growing medium and evaporate, it needs to pass through the full thickness of the growing medium, the design of the pot makes this difficult.

The liquid tube 9 can be closed or left open as a ventilation tube according to the plant's needs.

Components of the System

The liquid movement device is composed of hollow body, rock wool or bryophyte inside the hollow body, bag, liquid permeable material inside the bag and covering layer of rock wool or dry compressed bryophyte. The self-watering system is composed of the liquid movement device and a pot with aerations apertures on partition wall and air inlets distributed around the base of growing medium container.

The Plant

The Self-Watering System is suitable for halophytes plants living on seawater or brackish water and non-halophytes plants living on freshwater. The system is suitable for different stages of plant growth and propagation, including mature plants, seedlings, seeds, cuttings, and even specific plant parts like leaves, parts of leaves, and flower petals for certain plants.

The Self-Watering System is suitable for indoor plants, outdoor plants, gardens, parks, commercial mass production of vegetables and fruits, reforestations and desertification fighting.

Capillary Materials

The capillary material used for the current system are rock wool and bryophyte, both rock wool and bryophyte have efficient reliable capillary action.

What are the Unique Features of Rock Wool and Bryophyte?

The secret lies in the microstructure of these materials:

Rock Wool

In the manufacturing process of rock wool, the rocks are heated to temperatures exceeding 1500° C. to produce a molten lava-like substance. This molten rock is subsequently poured onto a spinning machine equipped with thousands of tiny holes. The centrifugal force generated by the spinning action pulls the material through these holes, producing fiber-like long strands 15-20 micrometers thick. These long thin strands and long thin spaces in between them create microcapillary action at the microstructure level of rock wool.

Bryophyte

Ectohydric mosses (almost all mosses) rely primarily on transport of water externally and can absorb water over the entire plant surface and there are no water repellent layers. Bryophytes benefit from a large surface area relative to their volume as they have numerous leaves and often form a paraphyllia structure (reduced leaflike structures on the stem or branches) and tomentum (felt-like covering of abundant rhizoids on stem).

The spaces between the shoots of the large concave leaves are about 1 mm, spaces between paraphyllia and leaves are about 100 micrometers, the space between leaf base and tomentum is about 10 micrometers.

These long thin spaces create microcapillary action at the microstructure level of bryophyte in the natural, dried and preserved form of bryophyte but not peat moss.

Peat moss, to clarify, is a decayed moss, which means peat moss loses the properties of moss and should be considered as a completely different material. The microstructure of moss was destroyed in the decaying process.

Peat moss is not a suitable capillary material for the current application due to its poor-quality capillary rise.

The unique and delicate microstructure and microcapillary action in rock wool and bryophyte do not exist in wicking capillary materials and are also not present in petrochemical derivatives like kitchen sponge, non-woven cloth and non-woven fabric.

Organic material from plants or animals also don't have the efficient unique microcapillary structures required.

Characteristics of Capillary Materials Suitable for the Current Application:

High Quality Capillary Rise

The material should have a very reliable capillary action suitable for this wide range of cultivation. Soil, granulated soil, fine sand, large particle sand and wicking materials should not be used as capillary material because of the low-quality capillary rise.

Safety

The capillary material should be non-toxic to humans, animals, or plants. Bear in mind, some of these capillary materials can be a focus for infection or colonization of bugs—for example kitchen sponge and some wicking materials.

Durability

Some capillary materials like kitchen sponge and insulation foams are not suitable as capillary material because over time, with frequent cycles of dry and wet, these materials shrink, shrivel, and retract at both ends creating an air void which will stop the system.

No Hydrophobic Phase

Repetition of cycles of dry and wet creates a hydrophobic phase-resistance to water entry, meaning it takes more time to saturate thus compromising the longevity of the system.

Good Water Holding Capacity

In practical terms, in the current application, the first part to dry is the liquid reservoir then the growing medium followed by the layer of rock wool or dry compressed bryophyte and finally the rock wool or bryophyte inside the hollow body. The capillary material should have good water holding capacity thus the liquid movement device will immediately function, even after draught because there is a residual hold of water or humidity within the capillary materials due to high water holding capacity.

Light in Weight and Containing Air

The capillary material should be light in weight and contain air, soil can't be used as capillary material because it is too heavy and dense and has no air inside, which does not allow hydrostatic pressure to work effectively.

Low Resistance to Hydrostatic Pressure

The capillary material should have little resistance to hydrostatic pressure.

Rock wool and bryophyte-natural, dried, or preserved, both are safe, Rock wool has been used since 1930s without any short or long-term adverse effect, and bryophyte is an organic material.

Both have exceptionally good capillary rise, contain air, are light in weight, have good water holding capacity, they don't shrivel nor retract, are always sensitive to water, they don't have hydrophobic phase. Both have little resistance to hydrostatic pressure.

Liquid Permeable Materials

Most prior art ignores the importance of the material used as recipient of water in growing medium. It is essential to consider the properties of recipient growing medium rather than to assume any growing medium will do the job, sending water to the base of the growing medium without paving the way for the water to reach the roots is not good enough. In the current application a defined and specific material is used.

Liquid permeable materials are natural, artificial or a mixture of materials. The liquid permeable material should have all three of the following properties:

High water infiltration rate
Allows water to drain at a moderate rate and without water pooling and puddling (Good drainage)
Composed of large or medium size particles only, (no clay, silt or small particles)

Small particles like fine sand or clay should be avoided as both consist of extremely low permeable matter. The function of liquid permeable material is to increase the water infiltration rate, with these properties it will absorb water from rock wool or bryophyte at a faster rate than soil.

The second important function of water permeable material is to work as a barrier preventing small particles from the growing medium from seeping into the rock wool and bryophyte inside the hollow body causing blockage of the system. However, liquid permeable material will not prevent seeping of small particles when used with an outdoor plant. Rain will bring small particles from soil, which will easily pass the liquid permeable material blocking the system, the same scenario will occur when spraying indoor plants, with dust causing the blockage. Blockage of the system because of small particles is unpredictable, it could occur after a few days or perhaps after several years. Liquid permeable materials by themselves are not enough of a barrier to prevent blockage.

Examples of Liquid Permeable Materials:

Perlite of both coarse and medium grade, medium and large size particle of sand, vermiculite medium and coarse and compost or any mixture of these materials.

Dry compressed bryophyte can be used as liquid permeable materials. These examples are not universally suitable for every plant species.

Bag of Flexible and Water Permeable Material

A bag made of a natural interwoven material like jute or synthetic interwoven material like organza. The function of the bag is to keep the liquid permeable materials inside the bag compressed and contained and to prevent loose contact between the rock wool or bryophyte and liquid permeable materials, as loose contact will lead to failure of the system.

Covering Layer of Rock Wool or Dry Compressed Bryophyte

The main function of this layer is to work as a filter which only allows water to pass through in any direction and prevents any small particles from passing through. It is the second layer of protection from small particles of growing medium. This layer guarantees there is no blockage regardless of where the pot is used. Rain brings small particles with it and spraying the plant brings dust with it, both small particles from soil and dust will not pass and stop the system. This layer will also increase the contact surface area between liquid movement device and growing medium by this reducing the humidity inside this layer and spreading the liquid evenly around the growing medium. This will encourage the plant to spread roots around in the growing medium.

If the system is used without the covering layer, this will limit the use of the system, rain and spraying should be avoided to prevent blockage of the system.

The most important disadvantage of using the system without the covering layer, it will lead to fast, abnormal growth of the plant. The plant will shoot small twisted wrinkly leaves without flower or fruit and if the is plant shook by touch or wind a larger number of leaves will fall—this due to a small surface contact area between the bag and growing medium, the roots will encircle themselves around the bag which affects the health of the plant. So, using the covering layer is particularly important for the system.

Aeration

The micro air current between the apertures in partition wall and air inlets are a crucial part of the system, moist air in the air gap will pass through the apertures to the growing medium and out of the pot through air inlets. When the planter used outdoor, winds may push dry air through air inlets increasing the level of aeration to the roots.

Plants will react differently towards the presence of the apertures and can be divided into four groups:

Group 1—most plants will send roots through the apertures all the way down to the liquid reservoir and start absorbing water and absorbing moisture in the air gap.
Group 2—some of the roots will dive to the liquid and other parts of the roots will stop inside the air gap for aeration and absorbing moisture.
Group 3—the roots only reach as far as the air gap. Group 4-will not send the roots through the apertures but benefit from air current inside growing medium.

In the current system the plants will by supply with water and air at the same time which makes the current application outstanding from prior art, supplying the plant with air and water affects the plant's health and wellbeing positively making plants growing in the current system superior to the plants in classic pot we are used to.

The number and size of air inlets and aeration apertures depend on plant species requirements, we should also not be generous with air inlets size and number because more aeration means more water lost to evaporation. If more water is needed, we should increase the number of liquid movement devices inside the pot, if necessary, to compensate water loss for evaporation and not let the plants dehydrate.

The aperture 22 in liquid reservoir as second option to fill the liquid reservoir with liquid is a vital part to reduce the humidity in tropical countries with high humidity and high temperature, more than one aperture 22 in liquid reservoir may be needed for certain plants in tropical climate to reduce the humidity.

The apertures and air inlets can be closed by thin layers of dry compressed bryophyte, rock wool or hay to prevent falling of growing medium outside the growing medium container. Aerating the growing medium will prevent stagnation, saturation, and high moisture accumulation in the base of growing medium container.

Growing Mediums

The current application can use both natural matters like soil, sand, compost, coconut coir, moss, peat moss and artificial matter like vermiculite, perlite, and leca (lightweight expandable clay) as a growing medium, either alone, or any mixed.

New growing medium can be added and used in the current application: pieces of any solid material as long as it is non-reactive and non-toxic to human, animals, and plants.

The new growing medium material could be pieces of stones, pebbles, metals, alloys, plastic, dry wood, or a mixture of pieces of any these material with or without conventional growing medium.

It is possible to replicate natural growing conditions which lithophyte plants enjoy by only using solid material rather than a traditional growing medium like soil. Non-lithophyte plants can grow in new growing medium. Liquid permeable materials can be used as growing mediums.

Dried plant fibers can be used as a growing medium, for example husk, palm bark fibers and loofah dry sponge, also dried plants roots and pieces of dried wood.

In the current application we avoid using small particles (particularly clay and silt) as capillary material due to low quality capillary action and also, we avoid using small particles in the liquid permeable material due to extremely low water permeability; however, soil and fine sand can be used as growing medium. Rock wool can be used as a growing medium.

Hollow Body

The function of hollow body is to create capillary action and to prevent any direct pressure or damage to rock wool or bryophyte inside it.

The width, shape and thickness of the hollow body is irrelevant, what is important is the size of the cross section of the inner hollow space inside the body containing the rock wool or bryophyte, which must always respect the capillary rise or Jurin's law.

The type of solid material used to make the hollow body is critical for example glass is superior to plastic in capillary rise, the adhesion force of water to glass is higher than the adhesion force of water to plastic.

The position of the hollow body inside the planter could be vertical or slanted, this will not affect the capillary rise as vertical tubes and oblique tubes have the same capillary rise.

Porous material can be used for the hollow body as there are no direct contact with small particles to block the pores, in this case there are two capillary actions, the primary one through the rock wool and secondary one, intramural through the pores in the wall of the hollow body, the two actions augment each other increasing the amount of water transported.

Flexible material can be used as hollow body for example a hosepipe.

Growing Medium Container

Made of solid materials, holes can be created in the container. Seedlings, seeds and cuttings can be planted through these holes.

The side wall of the growing medium container can be mesh, grille or otherwise apertured material for certain plants, for example orchids and cacti which need very little amount of water. This may also apply to a partition wall between the growing medium container and the liquid reservoir.

Liquid Reservoir

Made of solid impermeable material, the plant type and the size of the liquid reservoir will decide the periods of refilling, obviously the larger the water reservoir the longer the period between fills.

If opaque material is used to build the liquid reservoir, a liquid level indicator window should be added for clear visibility of liquid level.

If clear material like glass or plastic used as liquid reservoir, it should be tinted or shaded to prevent ugly algae growth in water reservoir-algae growth in the liquid reservoir will consume oxygen thus decreasing the percentage of dissolve oxygen in liquid, which will negatively affect the growth of the plant.

Tinted or shaded clear material will reduce the light strength and help protect the roots from light damage.

It is crucial not to fill the liquid reservoir to the top, an air gap in the reservoir is important to aerate the plant and to absorb moisture by the roots.

Partition Wall

The sole function of the partition wall is to prevent the growing medium from falling or escaping to the liquid reservoir. The positioning of partition wall horizontal or oblique is not critical.

The planter parts can be made modular, the growing medium container, the partition wall, and the liquid movement device in one part and the liquid reservoir alone in a second part, the two parts assembled by screw or press fit mechanism, the modular system facilitates cleaning of the liquid reservoir.

Liquid

Whilst the term liquid is largely used throughout, it will be understood that the liquid is water or a water-based solution containing nutrients. Plant hormones and vitamins may be added according to species needs.

The liquid can be fresh water, brackish water, and seawater as the application suitable for halophytes.

For indoors and outdoors the liquid may be colored, which help reduce the build-up of algae, as well as providing an aesthetic effect and greater visibility for determining liquid level.

Modern technology can incorporate to the current application, a water sensor may be added to liquid reservoir or growing medium, linked by blue tooth or Wi-Fi signals to electronic device to alert when low level of water or humidity, respectively.

All Parts of Self-Watering System are Made from Biodegradable Materials

All the system: the liquid movement device and the pot can be made from organic materials for example bamboo or wood for hollow body, bryophyte inside the bamboo, jute bag, dry compressed bryophyte inside the bag as liquid permeable materials, dry compressed bryophyte layer as cover and the pot from wood or gourds. All parts of the system can be made from biodegradable plastic. Waterproof hard cardboard is another suitable alternative to a biodegradable plastic system, using a thin layer of natural or artificial paint or glue to seal the inside and or outside of the pot. All biodegradable options are of great use to plant trees and in fighting desertification.

Figure 5:
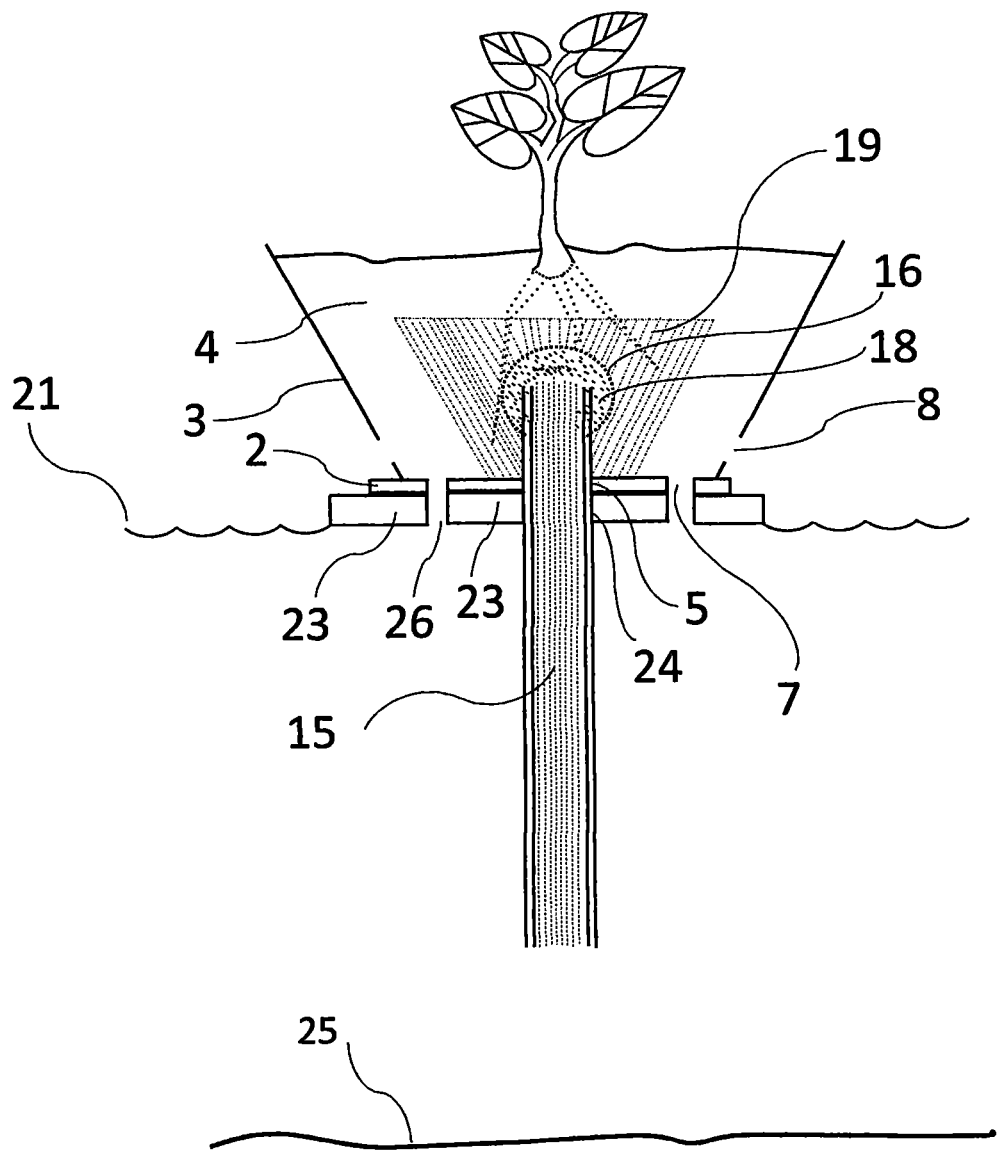
FIG. 5 illustrates cross-section view of a floating growing medium container standing on a floating raft above water level.

There are too many embodiments for the current system within horticultural, agricultural use and outside agriculture field. In this first part of the application, we will introduce only one embodiment for agricultural use:

Floating Planter, Second Embodiment FIG. 5

In this embodiment the growing medium container 3 and the partition wall 2 are made of buoyant materials. The growing medium container 3 standing on floating raft 23, the raft has a hole 24 for hollow body of the liquid movement device to submerge in water and the raft has many holes 26. The holes in the raft 26 are continuation of aeration apertures 7 in partition wall. The growing medium container 3 and the raft 23 floats in a body of water, fresh water, or seawater as liquid reservoir. The floating planter can be used in lakes, rivers, canals, and seas. This embodiment needs even less intervention, there is virtually no maintenance, there is even no need for watering.

Floating planters can be used as indoor and outdoor plants with a large fishbowl as liquid reservoir and small floating planter.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

DRAWINGS—REFERENCE NUMERALS

1—Planter/Pot
2—Partition wall
3—Growing medium container
4—Growing medium
5—First aperture in partition wall
6—Second aperture/Liquid inlet
7—Aeration aperture in partition wall
8—Air inlet at the base of growing medium container
9—Liquid tube
10—Liquid reservoir
11—Liquid
12—Hollow body
13—First opening of hollow body
14—Second opening of hollow body
15—Rock wool/Bryophyte inside the hollow body
16—Bag of interwoven material
17—Ribbon
18—Liquid permeable material
19—Layer of rock wool/Dry compressed bryophyte
20—Air gap/Air space
21—Liquid level
22—Aperture in liquid reservoir
23—Floating raft
24—Hole in Floating raft
25—Ground level/Lakebed
26—Hole in the raft

The invention claimed is:

1. A self-watering system, comprising:
a first container configured to hold liquid;
a second container configured to hold a growing medium and a plant, the second container located atop the first container;
a partition wall forming a top of the first container and forming a bottom of the second container;
a main aperture formed in the partition wall;
a body having a first volume defined inside the body, the body having an open top end and an open bottom end, the body extending from the first container through the main aperture into the second container;
at least one of a rock wool material and a bryophyte material substantially filling the first volume;
a fabric material defining a second volume, the top end of the body extending into the second volume;
one or more liquid permeable materials substantially filling the second volume and substantially surrounding the top end; and
a cover layer formed substantially of at least one of rock wool or dry compressed bryophyte, the cover layer substantially surrounding the fabric material.

2. The self-watering system of claim 1, wherein the liquid permeable materials includes particulate matter.

3. The self-watering system of claim 1, wherein the fabric material includes a flexible interwoven material and the liquid permeable materials are compressed by the fabric material within the second volume.

4. The self-watering system of claim 1, wherein the cover layer is configured as a filter to filter solid particles.

5. The self-watering system of claim 1, further comprising:
at least one aeration aperture formed in the partition wall.

6. The self-watering system of claim 1, further comprising:
at least one aeration aperture formed in a wall of the second container.

7. The self-watering system of claim 1, wherein the growing medium includes pieces of plastic.

8. A self-watering system, comprising:
a container configured to hold a growing medium and a plant, the container configured to be buoyant adjacent a liquid surface of a volume of liquid, the container including at least one sidewall and a bottom wall;
a main aperture formed in the bottom wall;
a body having a first volume defined inside the body, the body having an open top end and an open bottom end, the body extending from the container through the main aperture into the volume of liquid;
at least one of a rock wool material and a bryophyte material substantially filling the first volume;
a fabric material defining a second volume, the top end of the body extending into the second volume;
one or more liquid permeable materials substantially filling the second volume and substantially surrounding the top end; and
a cover layer formed substantially of at least one of rock wool or dry compressed bryophyte, the cover layer substantially surrounding the fabric material.

9. The self-watering system of claim 8, wherein the liquid permeable materials includes particulate matter.

10. The self-watering system of claim 8, wherein the fabric material includes a flexible interwoven material and the liquid permeable materials are compressed by the fabric material within the second volume.

11. The self-watering system of claim 8, wherein the cover layer is configured as a filter to filter solid particles.

12. The self-watering system of claim 8, further comprising:
at least one aeration aperture formed in the bottom wall.

13. The self-watering system of claim 8, further comprising:
at least one aeration aperture formed in a wall of the container.

14. The self-watering system of claim 8, wherein the growing medium includes pieces of plastic.

15. A liquid movement device:
a body having a first volume defined inside the body, the body having an open top end and an open bottom end;
at least one of a rock wool material and a bryophyte material substantially filling the first volume;
a fabric material defining a second volume, the top end of the body extending into the second volume;
one or more liquid permeable materials substantially filling the second volume and substantially surrounding the top end;
a cover layer formed substantially of at least one of rock wool or dry compressed bryophyte, the cover layer substantially surrounding the first liquid permeable material.

16. The liquid movement device of claim 15, wherein the liquid permeable materials includes particulate matter.

17. The liquid movement device of claim 15, wherein the fabric material includes a flexible interwoven material and the liquid permeable materials are compressed by the fabric material within the second volume.

18. The liquid movement device of claim 15, wherein the cover layer is configured as a filter to filter solid particles.

* * * * *